United States Patent [19]

Crema et al.

[11] Patent Number: 5,025,040

[45] Date of Patent: Jun. 18, 1991

[54] FLUID LOSS CONTROL ADDITIVES FOR OIL WELL CEMENTING COMPOSITIONS

[75] Inventors: Stefano C. Crema, Ypsilanti, Mich.; Clare H. Kucera, Tulsa, Okla.; Gerd Konrad; Heinrich Hartmann, both of Limburgerhof, Fed. Rep. of Germany

[73] Assignee: BASF, Porsippany, N.J.

[21] Appl. No.: 535,625

[22] Filed: Jun. 11, 1990

[51] Int. Cl.$^5$ .................. C09K 7/00; C08B 11/193; C08B 11/00; C08B 11/12

[52] U.S. Cl. ........................... 523/130; 524/5; 525/204

[58] Field of Search .................. 524/2, 3, 5 X; 523/130 I; 525/204 X

[56] References Cited

U.S. PATENT DOCUMENTS

| | | | |
|---|---|---|---|
| 3,197,428 | 7/1965 | Siegele | 525/60 |
| 3,359,225 | 12/1967 | Weisend | 524/2 |
| 3,491,040 | 1/1970 | Giugliemelli et al. | 521/40.5 |
| 4,015,991 | 4/1977 | Persinski et al. | 524/5 |
| 4,471,097 | 9/1984 | Uhl et al. | 525/326.7 |
| 4,681,634 | 7/1987 | Roca et al. | 524/5 |
| 4,931,489 | 6/1990 | Kucera et al. | 524/2 |
| 4,933,378 | 6/1990 | Kucera et al. | 524/2 |

*Primary Examiner*—Paul R. Michl
*Assistant Examiner*—Christopher P. Rogers
*Attorney, Agent, or Firm*—Martin Connaughton; Michael Chipaloski

[57] ABSTRACT

A cementing composition useful in cementing oil, gas and water wells, comprising water, hydraulic cement and an effective amount of water soluble fluid loss additive comprised of a blend of a copolymer of acrylamide/vinyl imidazole in a weight percent ratio of from about 95:5 to 5:95, said copolymer having a molecular weight range of from about 100,000 to 3,000,000, and a terpolymer of acrylamide/acrylamidomethylpropane sulfonic acid sodium salt/vinyl imidazole in a weight percent ratio of 60:20:20, said terpolymer having a molecular weight range of from about 100,000 to 3,000,000. The blend is comprised of a weight percent ratio of copolymer to terpolymer in the range of 20:80 to 80:20. The composition can also optionally include a dispersant such as sodium or potassium salts or a sulfonated naphthalene formaldehyde condensate.

6 Claims, No Drawings

FLUID LOSS CONTROL ADDITIVES FOR OIL WELL CEMENTING COMPOSITIONS

BACKGROUND OF THE INVENTION

1. Field of the Invention

The present invention relates to an aqueous cementing composition and a method of using the same in cementing oil and gas wells and the like. More particularly, the present invention relates to the incorporation into the cementing composition of a blend of copolymers, as fluid loss additives which have a synergism when combined into the blend. The blend includes a copolymer produced by the copolymerization of acrylamide and vinyl imidazole in ratios of from about 95:5 to 5:95 by weight, and a terpolymer of acrylamide and sodium salt of acrylamido methyl propane sulfonic acid and vinyl imidazole in a ratio of 60/20/20 as fluid loss additives in oil and gas well cementing operations.

The fluid loss additive blend is comprised of from about 20:80 to 80:20 copolymer to terpolymer, and preferably 60:40 copolymer to terpolymer.

The incorporation of the blend of such copolymers and terpolymers as fluid loss additives for the cement slurries used in the completion of oil and gas wells, greatly reduces the loss of water from the cement slurry to the rock formation. Indeed, a synergism is observed which is greatly unexpected when one considers the fluid loss control exhibited by the copolymer and terpolymer separately.

Optionally, a dispersant such as polynaphthalene sulfonate may also be incorporated into the cement slurry with the copolymer and terpolymer blend. When polynaphthalene sulfonate is incorporated into the slurry with the fluid loss additive, there is an added effect between the dispersant and the additive blend which results in an even greater reduction of fluid loss than could be achieved using either ingredient alone.

The incorporation of the fluid loss additives blends of the present invention into cement slurries greatly reduces fluid loss in oil and gas well cementing operations and allows for a more efficient bonding between the oil or gas well liners and the rock formations.

2. Description of the Prior Art

Oil well cementing and other underground cementing operations often require placement of a slurry of cement, water and other additives in a porous environment such a porous earthen or rock strata. For example, cement compositions are routinely used in the oil and gas industry to cement the annular space in the well bore between the surrounding formation and the pipe or casing. Typically, the cement slurry is pumped down the inside of the casing and back up the outside of the casing through the annular space. The slurry is allowed to set up or harden in the annular space, thereby forming a rigid column which ideally forms a bond with the earth or rock formations as well as with the metal pipe or casing. To achieve a satisfactory primary cementing job, it is essential to achieve a tight bond to prevent vertical communication of fluids or gas along or within the column, which could contaminate the producing zone, or permit a loss of reserves.

The primary functions of the cementing process are to restrict fluid movement between geological formations and to bond and support the casing or metal pipe. In addition, the cement aids in protecting the casing from corrosion, preventing "blow-outs" by quickly sealing formations, protecting the casing from shock loads in drilling deeper wells and sealing off lost circulation or thief zones.

A common problem in petroleum well cementing is the flow of liquid from the slurry into the porous earth formations in contact with the cement. This fluid loss is undesirable since it causes thick filter cakes of cement solids which can ultimately plug the well bore. The fluid loss can also damage rock formations and affect well production. Fluid loss from cement slurries is particularly a problem in a process known as "squeeze cementing".

Problems develop when water filters out of the slurry and into the porous media during the placement and setting period of the cement. As a result of the attendant rapid water loss, the cement experiences impaired qualities of strength and an uncontrolled setting rate. Also, the water loss from the cement frequently damages the porous rock formations. This problem cannot be solved by adding more water to the slurry as this approach only exacerbates the problem. In addition, serious placing and setting problems may occur.

It is therefore of utmost importance that fluid loss control be achieved in order to insure satisfactory primary cementing. Inadequate fluid loss control can result in the formation of a bridge in the annulus opposite a permeable zone, thus isolating a lower zone from the hydrostatic pressure above the bridge. Only a small amount of filtrate loss beneath such a bridge is then necessary to drop the annular pressure to beneath that of the formation. The result is an influx of formation fluids and pressure, thereby creating flow channels and the need for often times expensive remedial work.

In order to attempt the control of fluid loss from the cement slurry to the surrounding rock formation, the cement matrix permeability must be reduced. This reduction allows the retention of a greater amount of water during the initial set, thereby effectively blocking the porous strata from the cement. The art is replete with examples of methods to achieve this goal. One way is to reduce filtrate mobility by increasing the filtrate viscosity to counter the normal thinning of the cement slurry which occurs at down hole temperatures. An increase in filtrate viscosity at down hole temperatures minimizes thermal thinning and increases the retention of the filtrate within the cement matrix. Conventional fluid loss additives do not satisfactorily address the problem of thermal thinning with increased temperature, thereby allowing increased fluid loss from the slurry to the formation and promotion of stratification of solids within the cement slurry column.

Accordingly, there is a greatly felt need for new materials which, when added to the cement slurries, reduce fluid loss to the surrounding rock formations.

Fluid loss additives in cementing compositions are old and well known in the art. Fluid loss additives have been discussed in the following articles:

Carter, Gregg and Slagle, Knox, "A Study of Completion Practices to Minimize Gas Communication", Society of Petroleum Engineers, Paper No. 3164, November 1970.

Christian, W. W., Chatterji, Jiten and Ostroot, Warren, "Gas Leakage in Primary Cementing—A Field Study and Laboratory Investigation", Society of Petroleum Engineers, Paper No. 5517, October, 1975.

Cook, C. Cunningham, W., "Filtrate Control: A Key in Successful Cementing Practices", Journal of Petroleum Technology, August, 1977, page 951.

Smith, Dwight, "Cementing: SPE Monograph Volume 4, published by Millet the Printer, Inc., Dallas, Tex., 1976.

The patent literature is also replete with many attempts to overcome the fluid loss control problems associated with oil and gas well cementing operations. There are many references directed to protecting potable water by isolating hydrocarbon bearing strata by efficient cementing operations.

Uhl, U.S. Pat. No. 4,471,097 relate to auxiliary agents for chemical flooding of petroleum deposits and auxiliary agents used in well drilling fluids. These agents are water-soluble copolymers containing 20 to 80 percent by weight of unsaturated olefinic sulfonic acid, 5 to 15 percent by weight vinylacylamine, 0 to 40 percent by weight acrylamide and/or methacrylamide, 5 to 50 percent by weight vinylimidazole, 0 to 10 percent by weight of

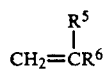

wherein $R^5$ is hydrogen or methyl, and $R^6$ represents hydroxy, alkoxycarbonyl with 1 to 12 carbon atoms in alkoxy moiety, cycloalkoxycarbonyl with 6 to 10 carbon atoms in cycloalkoxy moiety, phenyl, alkanoyloxy with 1 to 4 carbon atoms, or b-hydroxyalkoxycarbonyl with 2 or 3 carbon atoms in hydroxyalkoxy moiety; and 0 to 25 percent by weight of a crosslinking agent containing at least two olefinic double bonds.

These copolymers are used in drilling fluid additives during drilling operations. WP 8302449, which is the equivalent of U.S. Pat. No. 4,471,097 discloses the use of these copolymers in deep bore cement compositions to act as rheology additives.

No showing is made in Uhl et al of using these copolymers as fluid loss additives in cement slurries to avoid fluid loss from the cement to surrounding rock formations, and without adversely affecting the viscosity of the cement slurry.

Siegle, U.S. Pat. No. 3,197,428 discloses compositions comprising cement and copolymers of acrylamide and acrylic acid to improve well cementing operations and reduce fluid loss from the cement to the rock formations. However, the compositions of Siegle are not entirely satisfactory because they retard cement setting at high temperatures and so cannot be used at elevated temperatures and pressures such as are encountered in deep oil and ga well operations.

Weisend, U.S. Pat. No. 3,359,225 discloses cement additives containing polyvinylpyrrolidones and a condensate of sodium naphthalene sulfonate and formaldehyde. The polyvinylpyrrolidone reduces the separation of water from the cement slurry. The naphthalene sulfonate condensate is the dispersant. There is no teaching of the copolymers and/or terpolymers of the present invention.

Gibson et al, U.S. Pat. No. 3,491,040 disclose an aqueous hydraulic cement slurry including hydraulic cement, water, a surfactant and a small amount of polyalkylene polyamine, polyalkenimine or mixtures thereof. Gibson et al also disclose a sulfonated naphthalene condensate dispersant as an additional additive to the cement slurry which cooperates with the polyamine additive to provide satisfactory fluid loss in cement slurries used at about 200° F. and below. The sulfonated naphthalene dispersant is typically a low molecular weight material, e.g., in the range of about 1,000 to 3,000.

Harrison, U.S. Pat. No. 3,409,080 discloses an aqueous cementing composition which is adapted to high turbulent flow. The disclosure teaches the polyvinyl alcohol and polyvinyl acetate can be used as fluid loss additives in oil well cements.

Perisinski et al, U.S. Pat. No. 4,015,991, discloses a fluid loss additive for cement compositions which is a copolymer of acrylamide/2-acrylamido-2-methylpropane sulfonic acid derivative. These copolymers are useful only in operations where the bottom hole circulation temperature ranges from 90° to 125° F. Further, these copolymers have a salt tolerance of only up to 10 percent.

Cellulose-based fluid loss additives such as methyl cellulose, carboxymethylcellulose (CMC) and hydroxyethylcellulose (HEC) may be employed with or without a dispersant such as polynaphthalenesulfonic acid salts. However, there are several disadvantages to the use of CMC or HEC as cement fluid loss control additives. These materials are solid and as a result are difficult to handle in offshore operations. In addition, they tend to considerably increase slurry viscosity, thereby preventing its movement under turbulent flow conditions and retard the set of the cement. Also, these materials lose effectiveness in the presence of soluble calcium salts and at elevated temperatures.

Hence, the industry desires a fluid loss additive that has as little effect on cement properties as is possible and still provides for the fluid loss properties which are necessary for the cementing of casings to rock formations. Further, any fluid loss additives should be compatible with as many other additives as possible and should be usable over as wide a range of temperatures and other environmental conditions as is possible.

Summary of the Invention

The present invention relates to cementing compositions and more particularly to fluid loss additives which may be incorporated into the cement compositions. The cement compositions ar useful in cementing operations in oil and gas wells and are comprised of water, hydraulic cement and a blend of certain copolymers and terpolymers. The copolymer in the blend is a one of acrylamide and vinyl imidazole. The monomers of the copolymer are present in a ratio of 95:5 to 5:95, and more preferably in a ratio of from about 60:40. The terpolymer to be used, consists of acrylamides and acrylamidomethylpropane sulfonic acid sodium salt and vinyl imidazole. The terpolymer is comprised of 60 weight percent of acrylamide, 20 weight percent vinyl imidazole, and 20 weight percent acrylamidomethylpropane sulfonic acid sodium salt. The copolymer has a molecular weight range of from about 10,000 to 3,000,000 and preferably between 100,000 to 1,000,000 where the molecular weights have been determined by GPC using polyethylene glycol standards. When a terpolymer is employed, it has a molecular weight range of from about 10,000 to 3,000,000, and preferably between 100,000 to 1,000,000. The copolymer and terpolymer blend functions as a fluid loss additive and is present in an amount effective to reduce fluid loss from the cement slurry to surrounding rock formations. The blend exhibits a synergism which could not be expected when considering the copolymer and terpolymer separately.

Optionally, the cementing composition may contain an effective amount of a dispersant such as polynaphthalene sulfonate. When this dispersant is present, there is an added effect between the dispersant and the fluid loss additive blend which results in greater effectiveness of the system in reducing fluid loss than could be expected when using the dispersant and the copolymer and terpolymer blend separately. The dispersant also further decreases the viscosity of the slurry, thereby aiding in pumping of the slurry into the annular space.

The fluid loss additive blend may be used in any amount which is effective in reducing the fluid loss from the cement slurry to the surrounding rock formations. Ideally, the fluid loss additive blend should be present in an amount of about 0.05 to 2.0 percent by weight of the cement, and preferably in an amount of about 0.125 to 1.0 percent by weight of the cement. The blend is comprised of 20:80 to 80:20 copolymer to terpolymer, and preferably 60:40 copolymer to terpolymer.

DETAILED DESCRIPTION OF THE PREFERRED EMBODIMENT

Cementing compositions are disclosed which provide for fluid loss control and use over a wide range of temperature and well conditions. The cementing compositions are comprised of water, hydraulic cement, a fluid loss additive blend comprising a particular copolymer of an acrylamide and vinyl imidazole and a terpolymer of acrylamide, acrylamidomethylpropane sulfonic acid sodium salt an vinyl imidazole in a 60/20/20 ratio. The composition may also optionally, contain dispersant such as polynaphthalene sulfonate. The use of a dispersant has an added effect on the copolymer/ terpolymer blend and results in an increase in its effectiveness of fluid loss additive blend.

The copolymer used in the cementing compositions of this invention include acrylamide and vinyl imidazole. These are copolymerized in a weight ratio of from about 95:5 to 5:95 and preferably 60:40. The copolymer has a molecular weight of from about 10,000 to 3,000,000 and preferably between 100,000 to 1,000,000.

The copolymer is made in a conventional copolymerization process such as solution, emulsion or bulk polymerization in the presence of conventional free radical initiators. Such procedures are well documented and are well known to those skilled in the art.

The terpolymer useful in the blend consists of acrylamide, acrylamidomethylpropane sulfonic acid sodium salt, and vinyl imidazole.

The range of the three components of the terpolymer is from about 20 weight percent acrylamidomethylpropane sulfonic acid sodium salt, from about 60 weight percent acrylamide and from about 20 weight percent vinyl imidazole.

The terpolymer may be made by conventional polymerization techniques as are well known to those skilled in the art.

The fluid loss additive blend is comprised of from 20:80 to 80:20 copolymer to terpolymer, and preferably 60:40 copolymer to terpolymer. Synergism is most pronounced at the 60:40 ratio of copolymer to terpolymer.

The copolymer/terpolymer blend can be added to the cement composition in dry, solution or emulsion form.

The result of the inclusion of the fluid loss additive blends of the present invention are improved pumpability of the cement which generally improves drilling fluid removal and reduced possibility of lost circulation, when cementing a conduit penetrating a permeable earthen formation.

The cement component of the cement composition of this invention may be any of the API classes of cement or cement blends, as are defined in the American Petroleum Institute Bulletin entitled "API Specification for Material and Testing for Well Cements", Third Edition, dated July 1, 1986 ("API Spec. 10"), and incorporated herein by reference. These include cements defined as Classes A through H in API Spec. 10.

As previously stated, the cement compositions of this invention may optionally include dispersants such as any anionic surfactant i.e., any compound which contains a hydrophobic portion (e.g., any hydrocarbon substituent such as alkyl, aryl or alkylaryl group) and a hydrophilic portion (e.g., any negatively charged moiety, such as $O^-$, $CO^-_2$, or $SO^-_3$). Suitable dispersants include sulfonic acid derivatives of aromatic hydrocarbons, such as naphthalene sulfonic acid formaldehyde condensation product derivatives, particularly their sodium or potassium salts. Examples of dispersants which may be used include lignosulfonates, sodium and potassium naphthalene sulfonate formaldehyde condensation products (such as LOMAR D commercially available from Diamond Shamrock Chemical Company), and sodium salts of ketone sulfonate formaldehyde.

The cement compositions may also include at least one inorganic salt. Suitable salts include inorganic monovalent and polyvalent metal salts, such as magnesium chloride, ammonium chloride, sodium and potassium chloride and calcium chloride.

Other additives conventionally added to cement compositions useful in cementing casings in the bore hole of a well can also be added to the cement compositions of this invention in the amount which are normally used by those skilled in the art. These additives may include, for example, (1) heavy weight additives, such as hematite, ilmenite, silica flour and sand; (2) cement retarders such as lignins and lignosulfonates; and (3) additives for controlling lost circulation; such as walnut hulls and cellophane flakes.

The fluid loss additive blends of the present invention will effect a substantial reduction in the rate of water loss by filtration and in the apparent viscosity of the cement slurries. They are easily mixable and result in good fluid loss control while still exhibiting good flow properties at 0.05 percent to 2 percent by weight addition to the cement, depending upon the type of cement. Under API standards, excellent fluid loss rates below 100 cc/30 min can be achieved by the addition of about 0.05 percent to 2 percent by weight of the cement of such fluid loss additive to cement slurry of average density. Typically, a fluid loss of between about 20 and 100 cc/30 min., can be observed with a 0.25 percent to 0.50 percent by weight of the cement (BWOC) addition of the additives of the present invention.

Fluid loss properties can be controlled in salt cement formulations (such as up to saturated NaCl and seawater) with the addition of 0.25 percent to 0.50 percent by weight of the cement of the additives of the present invention without affecting rheology adversely.

Fluid loss varies as a function of molecular weight (MW). The molecular weight is a significant determinant in the properties of a product. The viscosity of a solution increases at a fixed concentration with higher MW of the solute. In addition, film and solution properties change with MW values. The molecular weight grades of various copolymers may be identified by a determination of, the intrinsic viscosities of the polymers which are defined in the following equation:

$$\text{Intrinsic Viscosity} = K(MW)^a$$

where K and a are constant for a given series of polymers.

As the intrinsic viscosity increases, one may extrapolate that the molecular weight of the additive increases. Further, the higher the molecular weight of the additive presumably the more viscous the cement slurry becomes, and the better the fluid loss properties become.

The fluid loss additive blends of the present invention exhibit some retardation effects on the cement slurry. The magnitude of the increase in thickening time of the cement slurries will depend on the temperature, pressures and slurry composition. Also, the additives of the present invention do not excessively thicken the cement, which allows for the incorporation into the cement of other additives and ingredients as many be dictated by on-site use conditions.

The following examples are presented in order to illustrate various aspects of the invention. Those skilled in the art will appreciate that the examples are not to be construed as limiting the scope and spirit of the invention.

In the following Examples, all cement slurries were prepared according to API Spec. 10, Third Edition, July 1, 1986.

Table I is an explanation of the symbols and abbreviations used in the tables containing the data of the examples. The symbols and abbreviations used therein are standard in the art and are well known to those of ordinary skill in the art.

TABLE I

EXPLANATION OF TERMS USED IN TABLES

| Notation | Explanation |
|---|---|
| FL (mL) | mL. of cement filtrate through a 325 mesh (45 m) stainless steel screen @ 1000 psi WP |
| FW (mL) | mL. of supernatant liquid above a column of cement slurry in stoppered 250-mL. graduated cylinder after 2 hours @ ambient temperature |
| TT (min) | time in minutes to reach 70 $B_c$ (Bearden |

TABLE I-continued

EXPLANATION OF TERMS USED IN TABLES

| Notation | Explanation |
|---|---|
| | United of consistency. 100 $B_c$ K 1000 mPa · s) |
| CS (psi) | Compressive strength, psi at indicated time. NS = not set. NS/RT = sample left overnight at room temperature did not harden. |
| Lomar D | Sodium sulfonated naphthalene/formaldehyde condensate from Diamond Shamrock (Henkel) |
| PV | Plastic Viscosity, cP (mPa · s) |
| YP | Yield Point, lb/ft$^2$ |

TABLE II

PERFORMANCE OF COPOLYMER/TERPOLYMER MIXTURES AS FLUID LOSS CONTROL ADDITIVES FOR CEMENT
Class H Cement, 38% H$_2$O
180° F., AP 1000 psi
All Tests Contain 0.25% Polymer Mixture and 0.50% Lomar D

| | 0 / 100 | 20 / 80 | 40 / 60 | 60 / 40 | 80 / 20 | 100 Copolymer / 0 Terpolymer |
|---|---|---|---|---|---|---|
| PV | 72 | 90 | 81 | 95 | 68 | 113 |
| YP | 0.000 | 0.224 | 0.415 | 0.367 | 0.272 | 0.272 |
| FL (mL) | 110 | 106 | 77 | 68 | 88 | 90 |
| FW (mL) | 0.1 | 0.1 | 0.1 | 0.1 | 0.1 | 0.1 |
| TT (min) | 343 | 239 | 262 | 275 | 280 | 230 |
| CS (psi) | — | 4218 | 3988 | 3924 | 3570 | >4000 |

Copolymer AM/VI 60/40
Terpolymer AM/Amps-Na/VI 60/20/20

The embodiments of the invention in which an exclusive privilege or property is claimed are defined as follows:

1. A cementing composition useful in cementing oil, gas and water wells comprising:
   a) water;
   b) hydraulic cement; and
   c) a fluid loss additive in an amount effective to reduce fluid loss, said fluid loss additive comprised of a blend of a copolymer of acrylamide and vinyl imidazole, in a weight percent ratio of from about 95:5 to 5:95, acrylamide to vinyl imidazole said copolymer having a molecular weight range of from about 10,000 to 3,000,000, and a terpolymer of acrylamide, acrylamidomethylpropane sulfonic acid sodium salt and vinyl imidazole in a weight percent ratio of 60:20:20; the ratio of copolymer to terpolymer being in the range of 20:80 to 80:20.

2. The composition of claim 1, wherein the fluid loss additive is present in an amount of from about 0.05 to 2.0 percent by weight of the cement.

3. The composition of claim 1, wherein the copolymer has a molecular weight of from about 100,000 to 1,000,000.

4. The composition of claim 1, further including a dispersant selected from the group consisting of lignosulfonates, sodium or potassium salts of a sulfonated naphthalene formaldehyde condensate, sodium salts of ketone sulfonate formaldehyde condensate, and mixtures thereof.

5. The composition of claim 1, wherein the copolymer is comprised of a 60/40 weight percent ratio of acrylamide to vinylimidazole.

6. The composition of claim 1, wherein the weight percent ratio of copolymer to terpolymer is 60:40.

* * * * *